2,996,505
Patented Aug. 15, 1961

2,996,505
PROCESS FOR THE PRODUCTION OF TRIAZINE THIOCYANATES
Werner Schwarze, Frankfurt am Main, Germany, assignor to Deutsche Gold- und Silber-Scheideanstalt vormals Roessler, Frankfurt am Main, Germany
No Drawing. Filed July 17, 1959, Ser. No. 827,722
Claims priority, application Germany July 24, 1958
2 Claims. (Cl. 260—249.8)

The present invention relates to an improved process for the production of thiocyanate derivatives of triazines.

The object of this invention is to provide a simple and economical process for the production of triazine thiocyanates.

It has been unexpectedly found, that it is possible, by the process according to this invention, to produce triazine thiocyanates in a simple way and with high yields by reacting mercaptoriazine with a cyanogen halide in the presence of a solvent such as water, alcohols and ketones, for example, acetone, or mixtures of these solvents. The preferred solvent is water. The solvent should also contain a hydrogen halide acceptor.

According to the invention, the mercapto compound which is to be reacted, is first suspended in the solvent and then sufficient alkali, such as a solution of sodium hydroxide, is added to the suspension to form the corresponding alkali salt of the particular mercapto compound being used. These salts are usually water soluble. The amount of alkali that is needed varies, depending on the number of SH groups that are present on the mercapto compound. In the case of the trimercaptotriazines, however, only 2 mols of the alkali metal hydroxide are employed for the neutralization and therefore only 2 SH groups are involved in the reaction in the formation of 2,4-dithiocyano-6-mercaptotriazine.

In practice, this reaction can be employed with all triazine derivatives which have the general formula

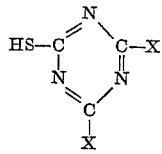

in which X represents an OH—, SH—, NH$_2$—, Cl— group or an aliphatic, aromatic or araliphatic radical, which can be bound to the triazine ring directly or through an intermediate oxygen, sulfur or nitrogen atom. The reaction must be conducted at a temperature which will forestall any reaction between the cyanogen halide and the solvent. For this reason, the reaction is conducted at lower temperatures down to —50° C. but most preferably between —5° C. and +10° C. However, the reaction is versatile enough to be conducted at higher temperatures of up to 100° C. if pressure is used.

The products produced according to this invention are useful as intermediates in organic syntheses as well as for fungicides and herbicides.

*Example 1*

54 g. of o-chloroanilino-dimercaptotriazine were dissolved in 500 ml. of 0.8 N sodium hydroxide. The solution was cooled to 0° C. and 30 g. of cyanogen chloride were gradually added thereafter. During the reaction the temperature climbed to +10° C. After a total elapsed time of 30 minutes the resulting precipitate was filtered off on a suction filter and washed well with water. The precipitate which was then dried under vacuum, amounted to 62 g. of analytically pure o-chloroanilino-dithiocyanotriazine which had a melting point of 130° C. The yield was 96.8% of the theoretical.

*Example 2*

5.4 g. of p-chloroanilino-dimercaptotriazine were dissolved in 200 ml. of 0.2 N sodium hydroxide. This solution was cooled to 0° C. and a solution of 5 g. of cyanogen bromide in 50 ml. of acetone was added to it dropwise. At this point the temperature was +2° C. The solution was stirred continuously for one hour. The resulting precipitate, p-chloroanilino-dithiocyanotriazine was filtered off on a suction filter and dried. Its melting point was 192° C. The yield, 5.5 g., corresponded to 86% of the theoretical.

*Example 3*

8.9 g. of trimercaptotriazine were dissolved in 250 ml. of 0.4 N potassium hydroxide. The solution was filtered and cooled to 0° C. and while the temperature was maintained at this level 6.3 g. of cynaogen chloride gas was introduced into the solution within 10 minutes. After an hour the resulting heavy, yellow precipitate was removed on a suction filter, washed with water and dried. On the basis of a C,H,N analysis the resulting compound was identified as dithiocyanomercaptotriazine with a melting point above 350° C. The yield of 10.2 g. was 78.5% of the theoretical.

*Example 4*

5.4 g. of diaminomercaptotriazine were dissolved in 100 ml. of a 1.6% by weight sodium hydroxide solution. After this solution had been filtered and cooled to 0° C., 3.0 ml. of cyanogen chloride were added to it all at once. The temperature of the solution rose to 10° C. and a heavy, white precipitate formed. After 30 minutes the precipitate was filtered off on a suction filter, rinsed and dried under vacuum at 40° C. An analysis indicated that the resulting compound was diaminothiocyanotriazine with a melting point of over 350° C. The yield of 6.1 g. corresponded to 96.1% of the theoretical.

*Example 5*

25.5 g. of bis-diethylamino-mercaptotriazine were dissolved in 250 ml. of methyl ethyl ketone and to it were added 25 ml. of 4 N sodium hydroxide. This solution was warmed for a short time and then cooled off to —5° C. 6 ml. of cyanogen chloride were then added to the solution and it was maintained at —5° C. for 6 hours while being constantly stirred. The acetone was removed by vaporization in a vacuum and the residue was dissolved in methylene chloride. 27 g. of bis-diethylamino-thiocyanotriazine were recovered by evaporating the solvent and drying the residue. This product was a colorless, non-distillable oil. The yield of 26 g. was 96% of the theoretical.

*Example 6*

8.7 g. of ethyl-dimercaptotriazine were dissolved in 100 ml. of a 4% by weight solution of sodium hydroxide and 100 ml. ethanol. 6 ml. of cyanogen chloride were added at 0° C. The remaining steps in the process were conducted as in the above examples. 8.9 g. of ethyl-dithiocyanotriazine, a yellow, non-distillable oil, were produced. The yield correspond to 78% of the theoretical.

*Example 7*

After 20 g. of pentachlorophenoxy-dimercaptotriazine were dissolved in 400 ml. of a 1% by weight solution of sodium hydroxide and it was cooled to 0° C., 6.7 ml. of cyanogen chloride were added to the solution. The procedure thereafter was the same as in Examples 1 to 5. 19.8 g. of pentachlorophenoxy-dithiocyanotriazine, a bright yellow powder with a melting point of over 350° C. were produced. The yield was 86.4% of the theoretical.

*Example 8*

17.3 g. of dimethoxy-mercaptotriazine were dissolved in a solution of 10.1 g. of triethylamine in 100 ml. of water. This solution was cooled to 0° C. and 6.6 g. of cyanogen chloride gas were slowly added thereto. A dense, white precipitate of dimethoxy-thiocyanotriazine immediately precipitated out. It had a melting point of 88–89° C. The yield, 18.2 g., was 91.7% of the theoretical.

Other compounds made in an analogous manner are:

Methoxy dirhodano triazine
Methylmercapto dirhodano triazine
Methylamino dirhodano triazine
Ethylamino dirhodano triazine
Cyclohexylamino dirhodano triazine
Dodecylamino chloro rhodano triazine
β-chloroethylamino dirhodano triazine
Cyanomethylamino dirhodano triazine
Diphenylamino dirhodano triazine
Ethoxy dirhodano triazine
Isopropoxy dirhodano triazine
Pentachlorophenoxy chloro rhodano triazine
Bismethylamino rhodano triazine
Bisdimethylamino rhodano triazine
Bisethylamino rhodano triazine
Ethylamino isopropylamino rhodano triazine
Ethylamino butylamino rhodano triazine
Bisbutylamino rhodano triazine
Bisisopropylamino rhodano triazine.

Many of these compounds were tested as fungicides. Various amounts of the compounds dispersed in water were sprayed on the leaves of wall flowers (*Cheiranthes cheiri*). These leaves were infected with germs of *Alternaria brassicicola*. These germs are deleted by active fungicides when used in concentrations under 5000 p.p.m. Such active fungicides include the following compounds produced according to the process of the present invention:

Bisisopropylamino rhodano triazine
Ethylamino isopropylamino rhodano triazine
Methoxy dirhodano triazine
Methylamino dirhodano triazine
Ethylamino dirhodano triazine
Cyclohexylamino dirhodano triazine
β-chloroethylamino dirhodano triazine
Cyanomethylamino dirhodano triazine
Ethoxy dirhodano triazine
Isopropoxy dirhodano triazine
Pentachlorophenoxy dirhodano triazine.

Other compounds produced by the process of this invention are also useful as insecticides, for example, dodecylamino chloro rhodano triazine can be used as a contact insecticide against houseflies (*Musca domestica*). When dispersed in water, bisbutylamino rhodano triazine and bisdimethylamino rhodano triazine delete the larvae of mosquitoes (*Aedes aegypti*).

A dispersion of ethylamino butylamino rhodano triazine in water sprayed on leaves deletes, 24 hours after the evaporation of the water, *Acyrthosiphon pisum*, when the latter is seated on these leaves.

A great number of the claimed compounds are good herbicides when used in the form of solutions in organic solvents or in the form of dispersions in water or in powdered form on carriers known per se. They can be applied as pre-emergence or as post-emergence herbicides.

I claim:

1. A process for the production of a thiocyanate derivative of triazine which comprises reacting cyanogen chloride with a triazine compound of the formula

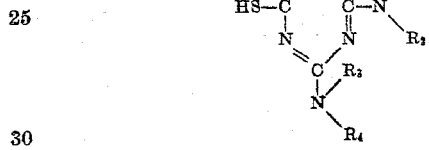

wherein $R_1$ and $R_3$ are each selected from the group consisting of hydrogen and alkyl radicals containing not more than 6 carbon atoms and $R_2$ and $R_4$ are alkyl radicals containing not more than 6 carbon atoms at a temperature between −50 and +100° C. in the presence of an alkaline acid acceptor, in an aqueous solvent in which said acid acceptor is substantially soluble.

2. A process as in claim 1 which is conducted at temperatures of −10° C. to +10° C.

References Cited in the file of this patent

UNITED STATES PATENTS 2,486,090    Abramovitch _____ Oct. 25, 1949

OTHER REFERENCES

Migrdichian "The Chemistry of Organic Cyanogen Compounds," ACS Monograph No. 105, pages 111–112, Reinhold Publishing Corporation, 1947.